(12) United States Patent
Xu et al.

(10) Patent No.: US 7,261,802 B2
(45) Date of Patent: Aug. 28, 2007

(54) EDI MODULE WITH STABILIZING DC CURRENT

(75) Inventors: Guorong Xu, Zhejiang Province (CN); Guolin Luo, Zhejiang Province (CN)

(73) Assignee: Zhejiang Omex Enviromental Engineering Ltd., Zhejiang (CN)

( * ) Notice: Subject to any disclaimer, the term of this patent is extended or adjusted under 35 U.S.C. 154(b) by 533 days.

(21) Appl. No.: 10/614,536

(22) Filed: Jul. 7, 2003

(65) Prior Publication Data
US 2004/0027100 A1 Feb. 12, 2004

(51) Int. Cl.
*B01D 61/48* (2006.01)
(52) U.S. Cl. ...................... 204/628; 204/632
(58) Field of Classification Search ................ 204/524, 204/533, 536, 632, 519, 628
See application file for complete search history.

(56) References Cited

U.S. PATENT DOCUMENTS

| | | | |
|---|---|---|---|
| 2,689,826 A | 9/1954 | Kollsman | |
| 2,815,320 A | 12/1957 | Kollsman | |
| 3,226,628 A * | 12/1965 | Kupferberg et al. | 323/257 |
| 4,925,541 A | 5/1990 | Giuffrida et al. | |
| 4,931,160 A | 6/1990 | Giuffrida | |
| 5,292,422 A | 3/1994 | Liang et al. | |
| 5,316,637 A | 5/1994 | Ganzi et al. | |
| 5,532,894 A * | 7/1996 | Sweaton | 361/18 |
| 5,558,753 A * | 9/1996 | Gallagher et al. | 204/632 |
| 6,190,528 B1 | 2/2001 | Li et al. | |
| 6,274,019 B1 * | 8/2001 | Kuwata | 204/632 |
| 6,391,178 B1 * | 5/2002 | Garcia et al. | 204/628 |

OTHER PUBLICATIONS

Siemens, Phase Control IC, TCA 785, pp. 1-16.
How the Omexell 210 Module Works—2 pgs.
The New Leader in EDI—Omexell 210 Module—2 pgs.
The New Leader in EDI—Omexell System—2 pgs.
English Translation of Chinese Application No. 02266165.4.

* cited by examiner

*Primary Examiner*—Arun S. Phasge
(74) *Attorney, Agent, or Firm*—Butzel Long

(57) ABSTRACT

A stabilizing DC current interface for an electro-deionization (EDI) water purifying module. Each EDI module comprises anionic/cationic membranes, a center pipe, nets/spacers in concentrate/dilute water chambers and an anode and cathode for coupling to the stabilizing DC current interface. Because a stabilized DC current is provided by the interface, the power to each EDI module is not influenced by water temperature, flow rate, water quality in the module, thereby providing a stabilized quality product water while saving energy. A plurality of EDI modules can be operated in electrical series using a DC current interface resulting in reduced DC power consumption.

34 Claims, 8 Drawing Sheets

EDI MODULE WITH STABILIZING DC CURRENT

CROSS-REFERENCE TO RELATED APPLICATIONS

This application claims the benefit under §119 (a) of Chinese Patent Application No. 02266165.4 filed on Aug. 7, 2002 entitled SPIRAL WIND EDI MODULE WITH STABILIZING CURRENT DC and whose entire disclosure is incorporated by reference herein.

BACKGROUND OF THE INVENTION

1. Field of Invention

This invention relates to an electro-deionization (EDI) water producing apparatus adapted to transfer ions in a liquid under the influence of an electric field, and more particularly, to such an EDI apparatus that utilizes stabilizing DC current.

2. Description of Related Art

Previously, various techniques have been developed to purify and isolate liquids or to obtain concentrated pools of specific ions or molecules from a liquid mixture, such as electrodialysis, liquid chromatography, membrane filtration, ion exchange, etc. Electro-deionization (EDI) is a technique that removes ionizable species from liquids using electrically-active media in an electrical potential to influence ion transport. The electrically-active media may alternatively collect and discharge ionizable species, or facilitate the transport of ions continuously by ionic or electronic substitution mechanisms.

The first apparatus and method for treating liquids by EDI was described by Kollsman in U.S. Pat. Nos. 2,689,826 and 2,815,320. Improved EDI systems have been shown in U.S. Pat. Nos. 4,925,541; 4,931,160 and 5,316,637. The typical structure of a module used for EDI includes alternating electroactive semi-permeable anion and cation ion exchange membranes in a stack mechanical sheet type structure.

An EDI apparatus having a helical configuration is shown in U.S. Pat. No. 6,190,528 (the '528 patent, which is based upon Chinese Patent No. 98223514) and whose entire disclosure is incorporated by reference herein. In the '528 patent, an insulated net-separating wall is positioned between a pair of anion and cation exchange membranes to form a special membrane bag type flow unit (hereinafter referred to a "first flow unit"). Each first flow unit is linked with at least one slot on a side wall of a central pipe, and is rolled to form a spiral wounded cylinder structure which centers on the central pipe. A conductive crust or shell is formed by winding metal outside the cylinder and electrically-active media (e.g., ion exchange resin) is inserted into the regions between the membrane bags to form a second flow unit. The product is enclosed by a housing with dome-shaped covers.

Previously, because of the electrode configuration, (for example Chinese Patent No. 98223514 which uses simple bridge-type rectification), energizing such EDI modules, unstable currents between the electrodes are experienced due to variances which include factors such as, but not limited to, unstable or fluctuating feedwater temperature, feedwater flow rate and feedwater quality, unstable or fluctuating EDI module input voltage, variances in construction of EDI modules themselves, etc., resulting in unstable product water quality. Thus, there remains a need for stabilizing these currents between the electrodes. There also remains a need for configuring a plurality of EDI modules with an electrical power interface while reducing the current requirement.

All references cited herein are incorporated herein by reference in their entireties.

BRIEF SUMMARY OF THE INVENTION

An electrical power interface for energizing at least one electrodeionization (EDI) module from an alternating current (AC) source wherein the at least one EDI module purifies a fluid (e.g., water) flow when DC power is provided between an anode and a cathode of the at least one EDI module. The electrical power interface converts the power from the AC source into stable DC power that is unaffected by the fluid temperature, fluid flow rate, fluid quality, or variances in the AC source or in the construction of the at least EDI module (e.g., unstable or fluctuating feedwater temperature, feedwater flow rate and feedwater quality, unstable or fluctuating EDI module input voltage, variances in manufacturing of EDI modules themselves, etc.).

A method for providing a stable DC current to at least one electrodeionization (EDI) module from an alternating current (AC) source wherein the at least one EDI module purifies a fluid (e.g., water) flow when DC power is provided between an anode and a cathode of the at least one EDI module. The method comprises the step of: rectifying the AC power from the AC source into DC power using phase control and DC power feedback to stabilize the DC current after rectification that is unaffected by the fluid temperature, fluid flow rate, fluid quality, or variances in the AC source or in the construction of the at least one EDI module (e.g., unstable or fluctuating feedwater temperature, feedwater flow rate and feedwater quality, unstable or fluctuating EDI module input voltage, variances in manufacturing of EDI modules themselves, etc.).

An electrical power interface for energizing at least two electrodeionization (EDI) modules connected in electrical series from an alternating current (AC) source, the at least two EDI modules purifying a fluid (e.g., water) flow when DC power is provided between an anode of one of the at least two EDI modules and a cathode of the other one of the at least two EDI modules. The electrical power interface comprises a rectifier for converting the power from the AC source into DC power and wherein the rectifier powers the at least two modules with the same DC current.

A method for providing a DC current to at least two electrodeionization (EDI) modules, connected in electrical series, from an alternating current (AC) source wherein the at least two EDI modules purify a fluid (e.g., water) flow when DC power is provided between an anode of one of the at least two EDI modules and a cathode of the other one of the at least two EDI modules. The method comprises the step of: rectifying the AC power from the AC source into DC power and powering the at least two EDI modules are energized with the same DC current.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1A:
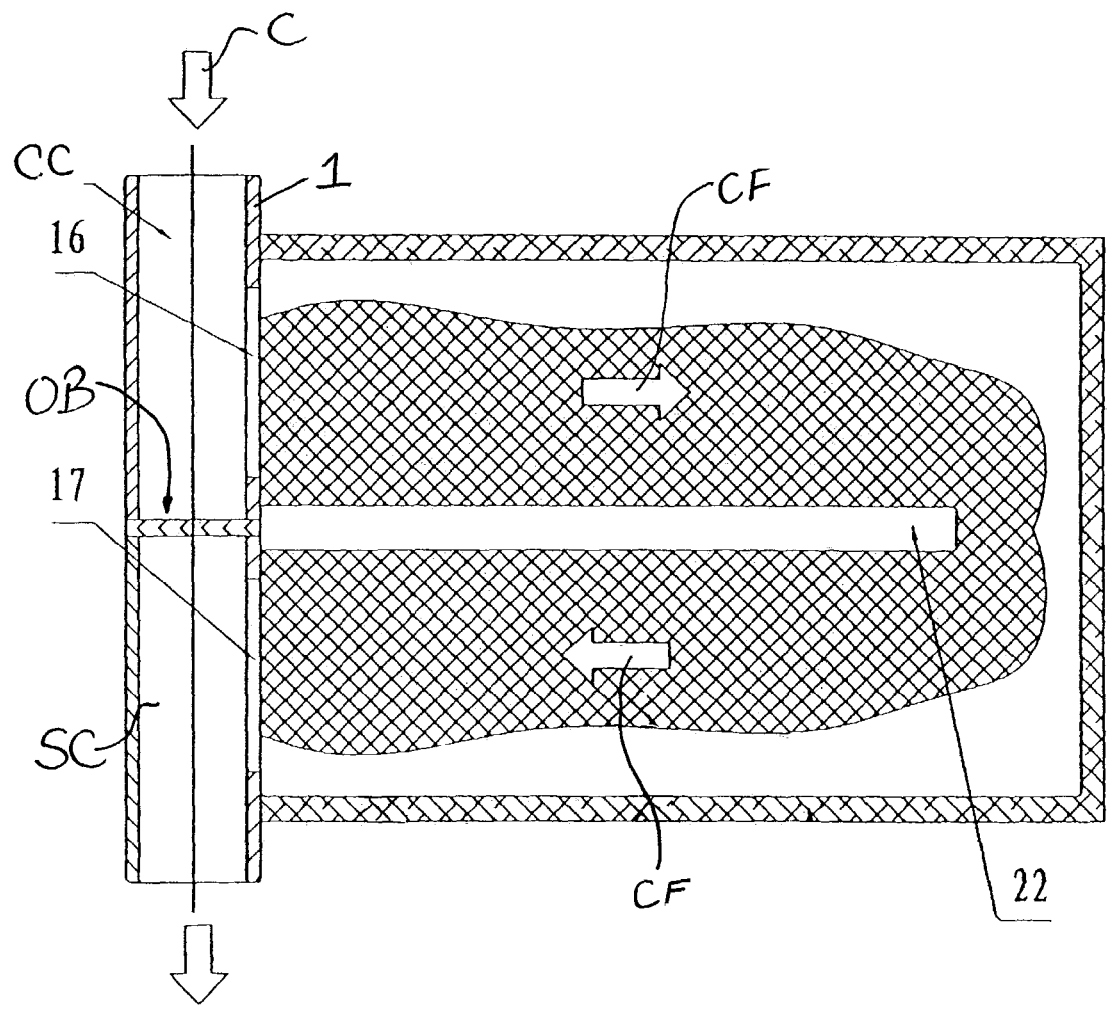
FIG. 1A is a cross-sectional view of an exemplary electrodeionization (EDI) module, a spiral-wound EDI module, along its longitudinal axis as set forth in U.S. Pat. No. 6,190,528.

Before a discussion of the present invention is made, a discussion of an exemplary EDI module, e.g., a spiral-wound EDI module, is given. FIG. 1 of the present application corresponds to FIG. 3 of the '528 patent (discussed earlier). However, it should be understood that the spiral-wound EDI module is given by way of example only and that the present invention has applicability to EDI modules in general.

A practical example: As shown most clearly in FIG. 1A, concentrate C enters a metallic pipe 1 which is centered in the EDI module. The center pipe 1 includes an obstruction OB positioned half-way down the pipe 1. The center pipe 1 serves as the cathode of the spiral-wound EDI. The top half of the pipe 1 serves as a collecting chamber CC of concentrate and the bottom half of the pipe serves as a supplying chamber SC of concentrate. Concentrate flow CF is through a concentrate distribution aperture 16, around a guide band 22 and then into concentrate gathering aperture 17.

Figure 1B:
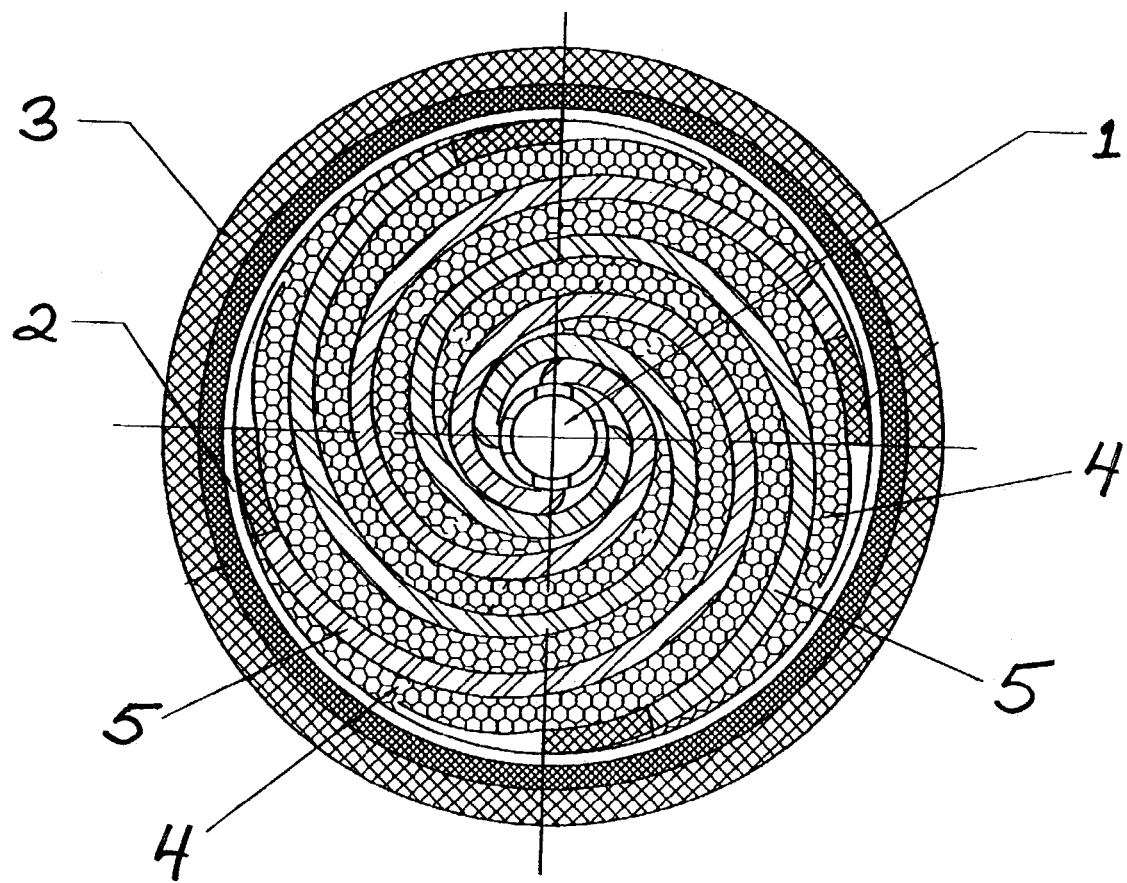
FIG. 1B is a cross-sectional view of an exemplary electrodeionization (EDI) module, a spiral-wound EDI module, along its transverse axis as set forth in U.S. Pat. No. 6,190,528.

As shown most clearly in FIG. 1B, alternating anionic/cationic membranes form a concentrate chamber 5 having concentrate spacers (through which the concentrate flow CF passes) and a dilute chamber 4 having dilute spacers/ion exchange resins through which the purified liquid passes. These spiral membranes, chambers and spacers are wound around the center pipe 1 together to form a cylinder.

A metallic lining 2 covers the cylinder and serves as the anode. All of the foregoing is enclosed within a pressure vessel 3 outer wall.

Figure 2:
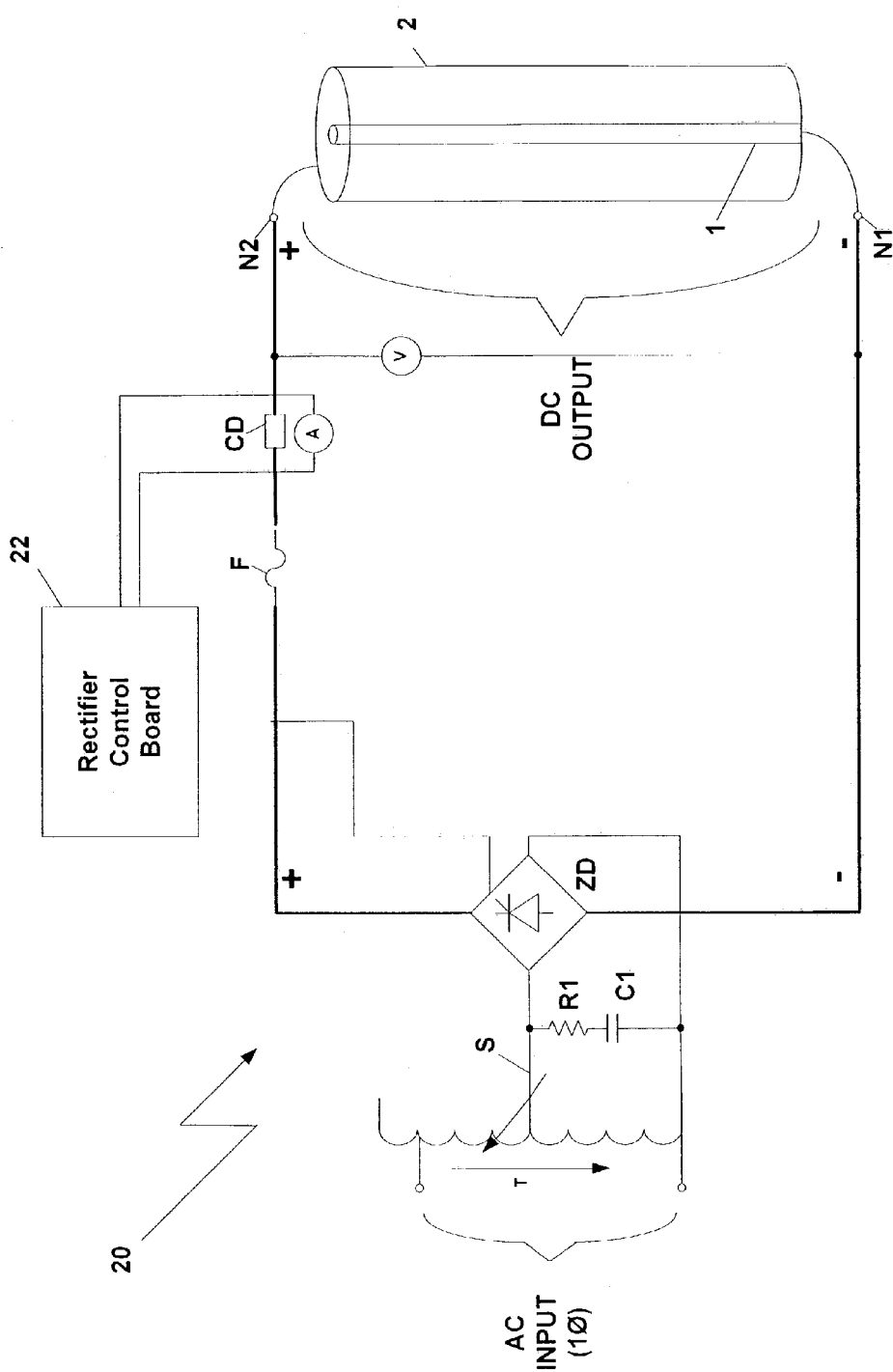
FIG. 2 is a schematic of the present invention providing stable DC current output to the EDI module for a single phase AC input.

The invention 20 of the present application is shown in FIG. 2. AC power (e.g., 220VAC) is coupled to the primary input coil of a transformer T which is an adjustable single-phase self-coupling transformer (e.g., an autotransformer). The secondary output coil of the transformer T is coupled to a rectifier ZD (e.g., IRKT105/1600V rectifier by International Rectifier) through a filtering network comprising a series resistor R1 and capacitor C1 which is connected across the input of the rectifier ZD. Control of the rectifier ZD is achieved by a rectifier control board 22 (e.g., KCR-S2 by Changzou Heat Control, Inc.) which uses feedback from the positive DC output of the rectifier ZD via a current distributor CD (e.g., DC30A/75 mW, or resistor); a fuse F (e.g., RSO-30A) is provided for safety. The positive DC regulation node N2 is coupled to the metallic lining 2 (anode) of the EDI module while the return DC node N1 is coupled to the metal pipe 1 (cathode) of the EDI module; terminals (not shown) on the EDI module for coupling to the nodes N1/N2 are available on the outer wall of the pressure vessel 3. To facilitate the operator in obtaining the proper DC current and voltage output, an ammeter A and voltmeter V are provided, as shown in FIG. 2. Thus, the operator can manually adjust the autotransformer T to obtain the proper DC current/voltage output by monitoring the ammeter A and voltmeter V.

Figure 3:
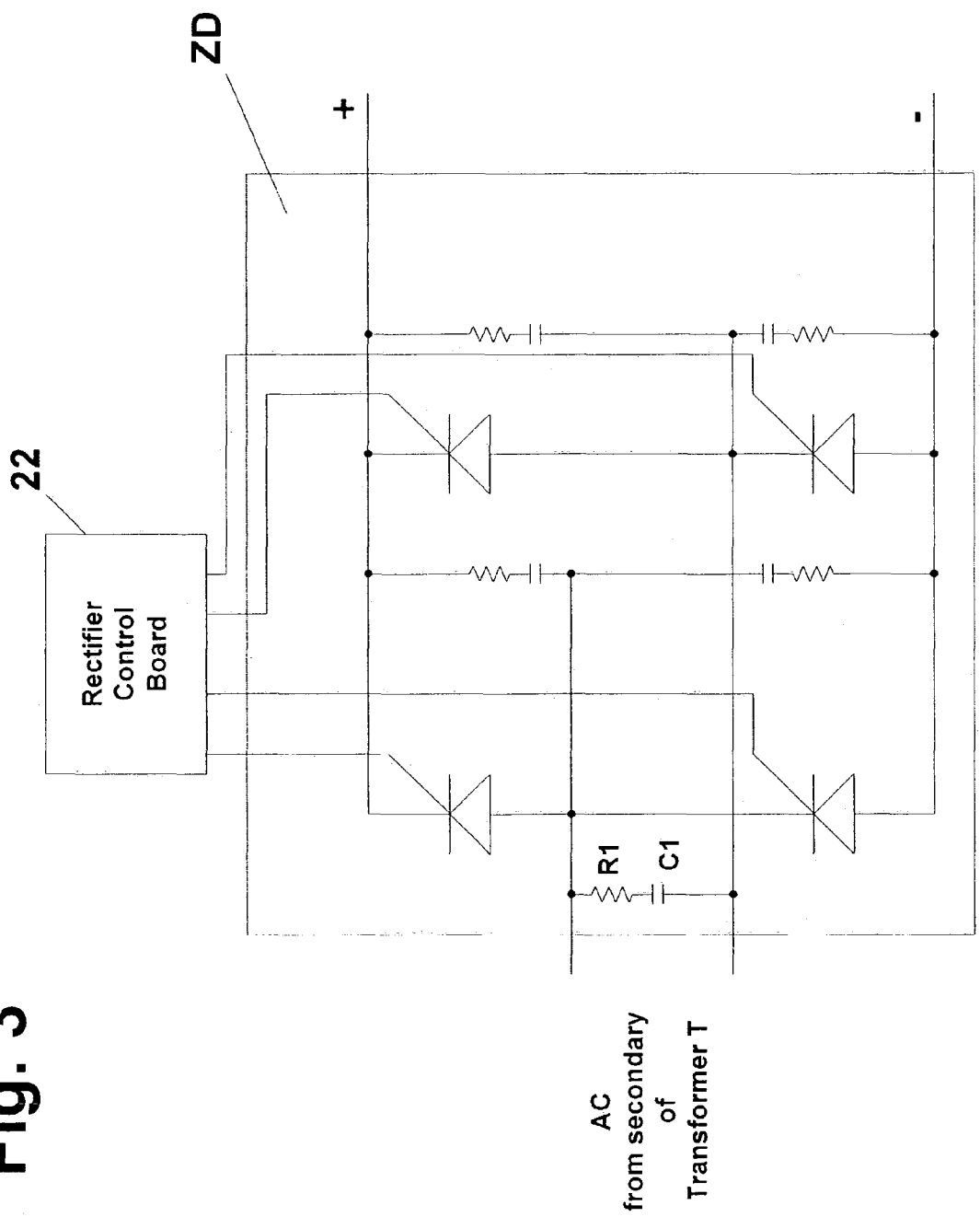
FIG. 3 is a functional diagram of an exemplary rectifier used in the present invention for a single-phase AC input.

As shown in FIG. 3, the rectifier ZD may comprise a plurality of silicon controlled rectifiers (SCRs, or thyristors, or triacs, such as the TMXC10, etc.) and capacitors (e.g., 0.47 µF/1000V) and resistors (e.g., 120 Ω/20 W) in a bridge configuration. The gate inputs of the silicon controlled rectifiers are controlled by the RCB 22.

Figure 4:
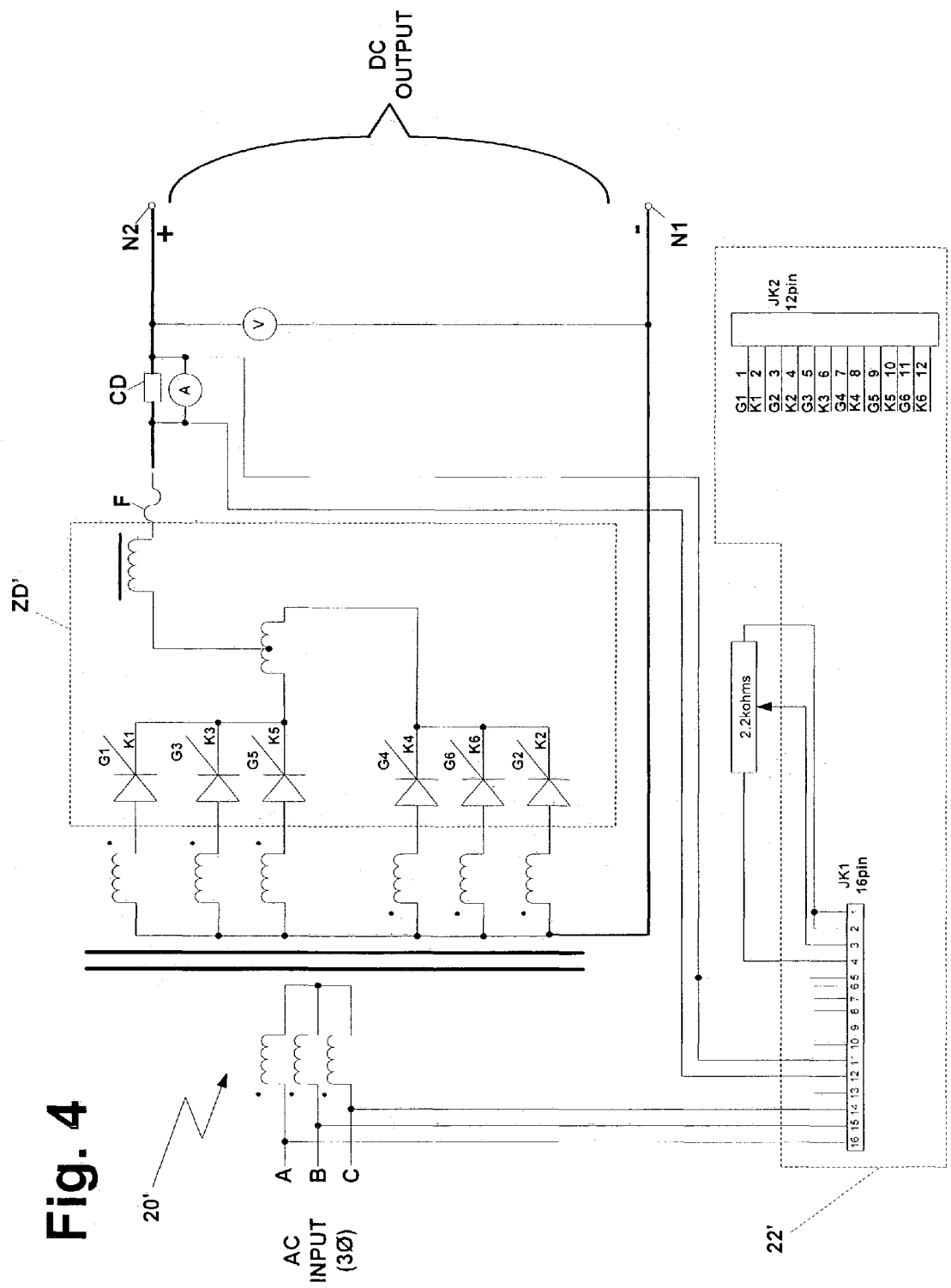
FIG. 4 is a functional diagram of an exemplary rectifier used in the present invention for a three-phase AC input.
Figure 5:
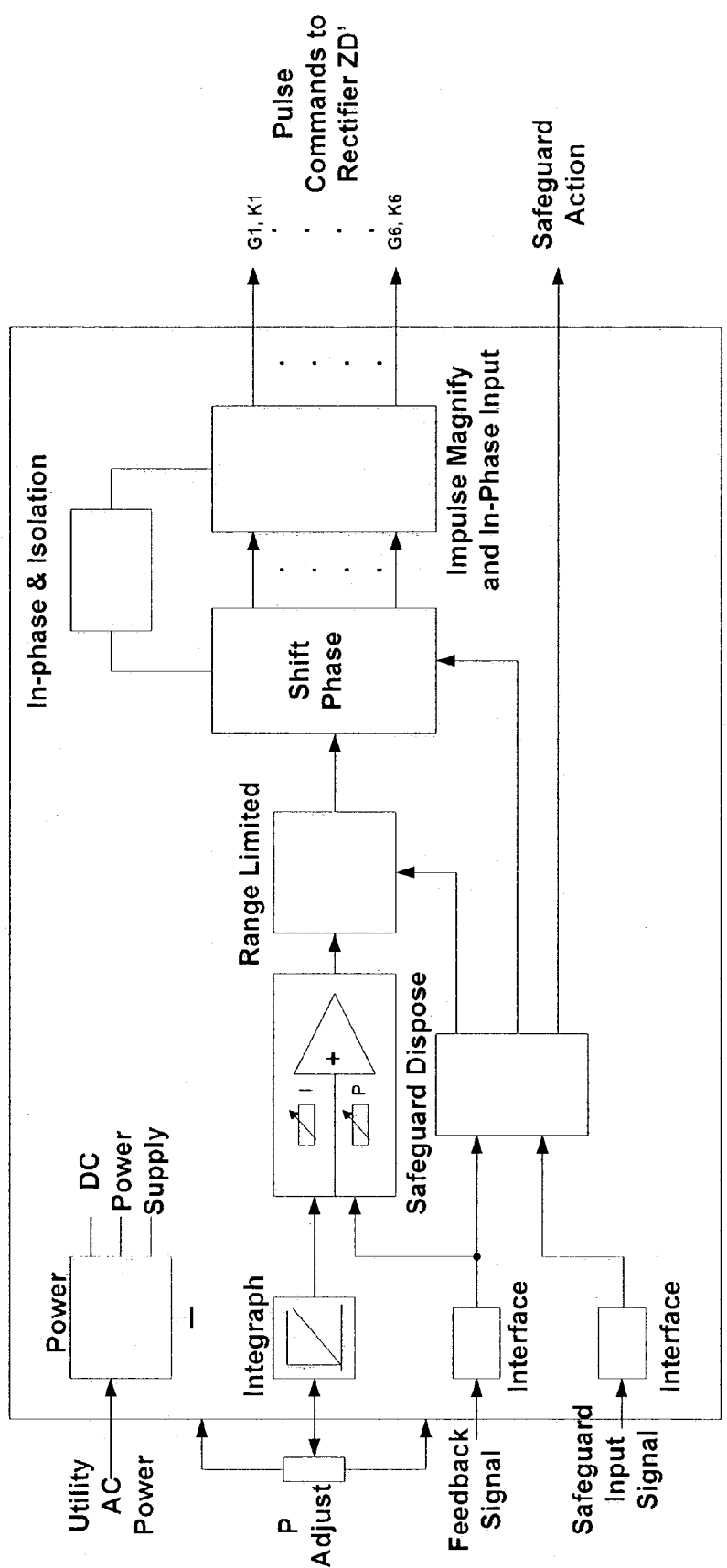
FIG. 5 is an exemplary functional diagram of a rectifier control board used in the present invention for a three-phase AC input.

A functional diagram of the RCB is shown in FIG. 4 based on a three-phase AC input using a three-phase rectifier ZD', it being understood that use of single phase or two-phase AC input would comprise a simpler RCB configuration but using the same principle of operation; thus, the RCB for three-phase operation is hereinafter referenced as RCB 22'.

The RCB 22' (e.g., a KCR-S3A by Changzou Heat Control, Inc.) provides the phase-control (e.g., KC785 or TCA785 phase controller integrated circuits, etc.) to the rectifier ZD by controlling the conduction of each SCR based on synchronization with the AC input. The RCB 22' generates precise pulse commands to each gate of the individual SCRs in the rectifier ZD' to rectify the AC input power. As shown in FIG. 4, the RCB 22' uses proportional/integral (PI) control, along with the feedback signal (e.g., voltage feedback, 1-5VDC) from the current distributor CD, and in synchronization with the AC input, to generate precise pulse commands (e.g., pulse command parameters such as pulse width, amplitude, rising/falling edge slopes, etc.) to the rectifier ZD'. An external potentiometer P permits the PI control to be adjusted accordingly to achieve the stabilized DC current/voltage output. In operation, the RCB 22' operates continuously to fire the SCRs precisely to generate and maintain the stable DC current and voltage.

When the EDI module is initially energized, the output voltage of the rectifier is incrementally raised to 300VDC; at the same time, the current increases as the conductivity of the concentrate chamber 5 in the EDI module increases. Once the current begins to exceed 2.5 Amps, the voltage is adjusted to maintain the current at this amperage, thereby obtaining a stable quality water product.

Figure 6:
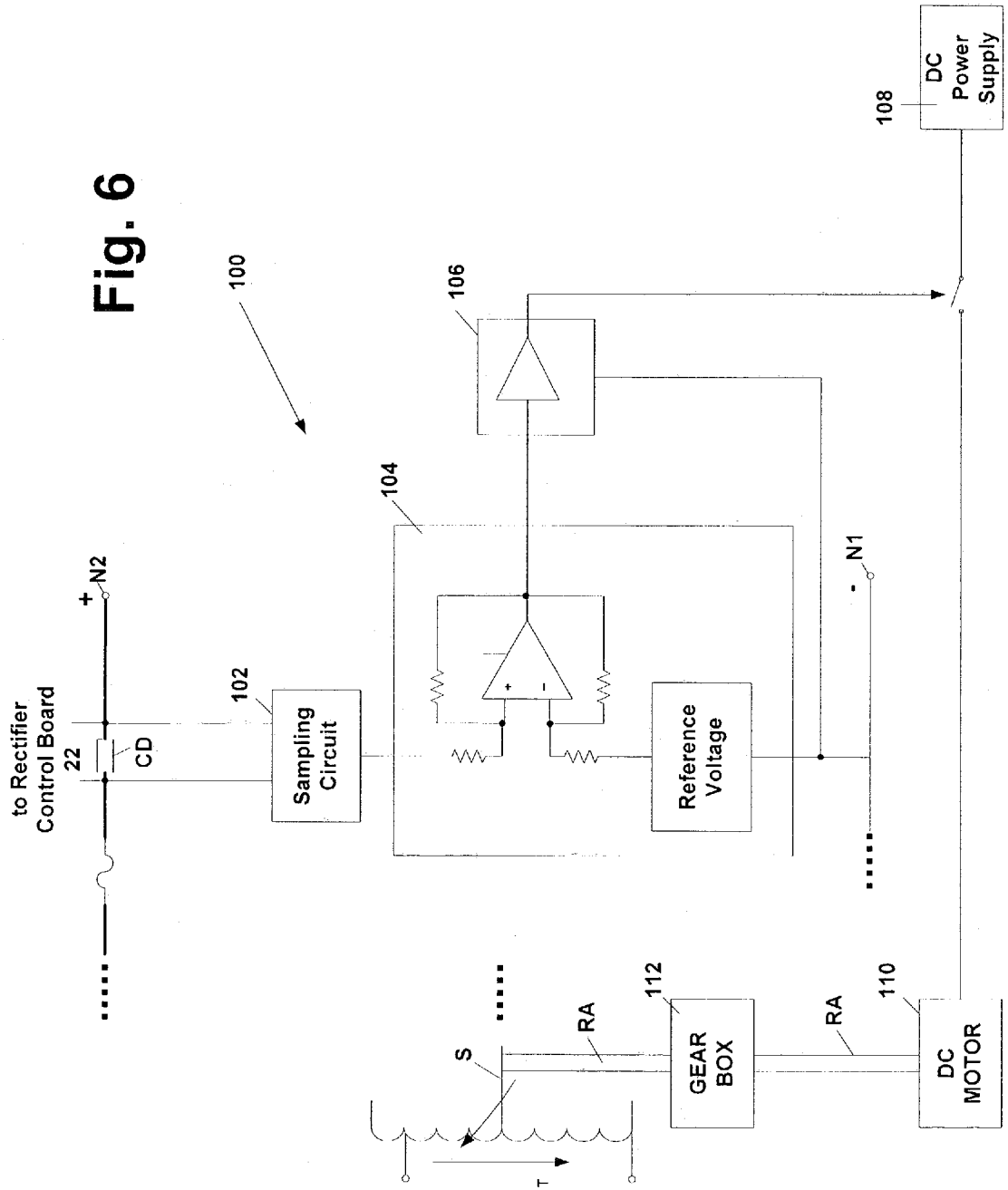
FIG. 6 is a block diagram of the present invention using an automatic control system for automatically adjusting the DC output using a single-phase AC input.

As mentioned earlier, the operator can manually adjust the autotransformer T to obtain the proper DC current/voltage output by monitoring the ammeter A and voltmeter V. However, it should be understood that an automatic control system 100 (FIG. 6) can also be implemented to automatically adjust the DC voltage/current, without the need for manual intervention. By way of example only, using a single-phase AC input, the spindle S of the autotransformer T can be coupled with the rotational axis RA of a minitype DC motor 110 and a gear box 112. The DC motor 110 is coupled to a constant current DC power supply 108 that is controlled by the automatic control system 100. The automatic control system 100 comprises a sampling circuit 102, a reference voltage circuit 104, an amplifying circuit 106, the DC power supply 108, the DC motor 110 and the gear box 112. As a function of the sampling circuit 102 and the reference voltage circuit 104, the DC voltage is constantly compared to the reference voltage and the difference is amplified by the amplifying circuit 106. The output of the amplifying circuit 106 activates the DC motor 110 to operate the spindle S of the autotransformer T to adjust the voltage, thereby stabilizing the DC output current.

Thus, by using the electrical power interface 20/20' of the present invention of FIG. 2/FIG. 4 for any EDI module (not just spiral-wound EDI modules), the result is the establishment of a stable DC current indicative of a stable qualified product water which avoids the influence of variances such as, but not limited to, unstable or fluctuating feedwater temperature, feedwater flow rate and feedwater quality, unstable or fluctuating EDI module input voltage, variances in the manufacturing or construction of the EDI modules themselves, etc.

Figure 7:
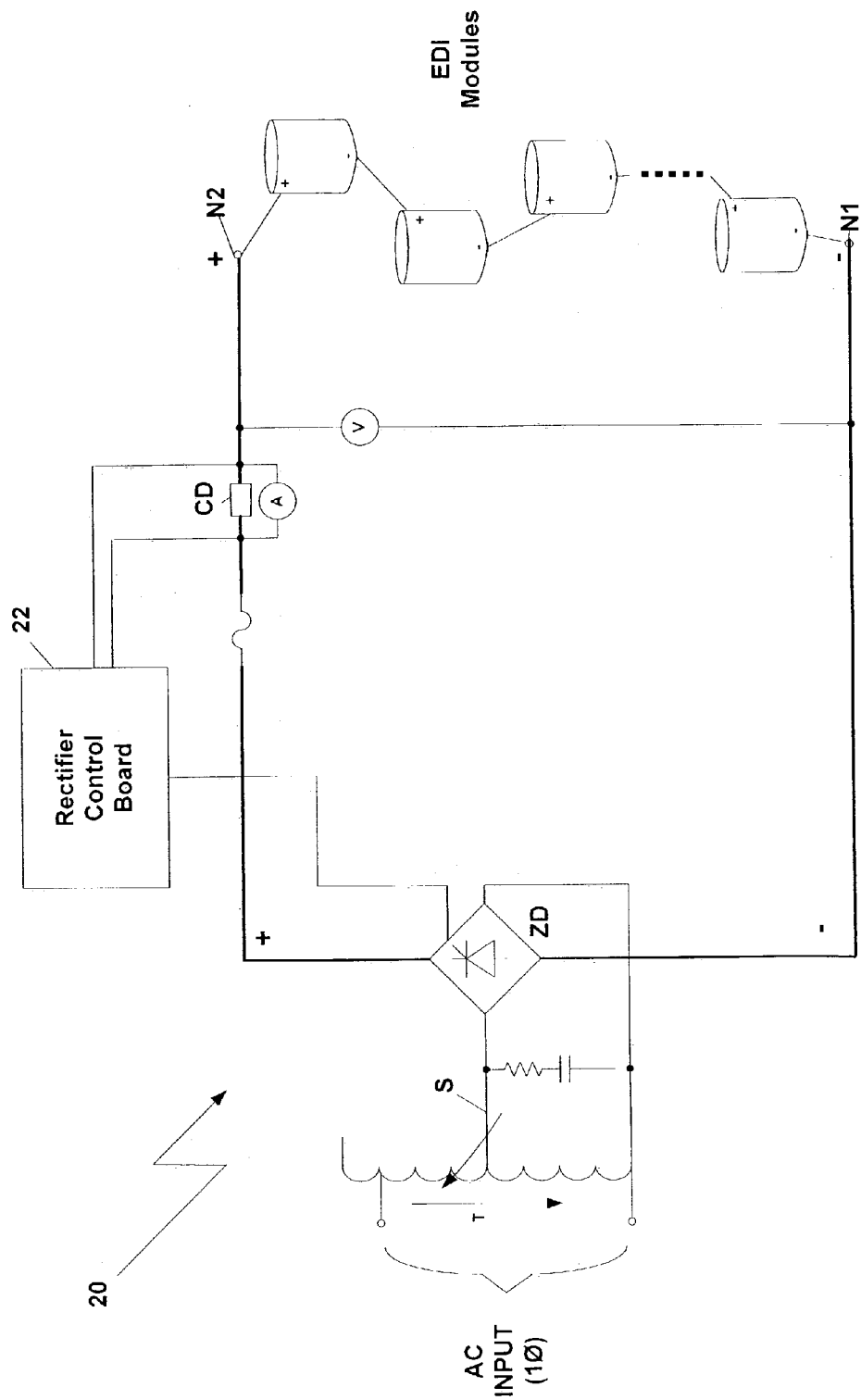
FIG. 7 is a schematic of the present invention providing stable DC current output to a plurality of EDI modules coupled in series thereto and using a single-phase AC input.

Another advantage of using this stable DC power interface is that an energy saving in DC power consumption is achieved. In particular, the present invention 20/20' provides for the electrical serial connection of a plurality of EDI modules, thereby reducing the current requirement. For example, as shown in FIG. 7, a plurality of EDI modules are connected in series between the regulation node N2 and the return node N1 of the present invention 20 (it being understood that a plurality of EDI modules could also be serially-coupled to the present invention 20'). Currently, where a plurality of EDI modules are used, they are connected in parallel and, if the modules are running at near full load, the power requirements are approximately 160VDC@6 amps. As can be appreciated, the use of two or more such parallel-configured EDI modules requires a large draw of current (e.g., 12 amps for two EDI modules, 18 amps for three EDI modules, etc.). In contrast, using the present invention 20 where stable DC currents can be generated, two or more EDI modules can be connected in series without having to increase the current (FIG. 7). Thus, by increasing the DC voltage across the regulation node N2/return node N1, (e.g., 320VDC for two EDI modules, 480VDC for three EDI modules, etc.) these serial-connected EDI modules can be operated with no extra current draw. Not only does this reduce the DC power consumption but it reduces the required size of rectifier in half. Furthermore, it should be understood that it is within the broadest scope of the present invention to include the automatic control system 100 (FIG. 6) for automatically controlling the electrical power interface 20 where a plurality of EDI modules are coupled to the present invention 20/20' in series.

It should be understood that it is within the broadest scope of the present invention to include the electrical series connection of at least two EDI modules to any electrical power interface, not just the electrical power interface 20/20'. Thus, for the reasons discussed above, the reduced power consumption is achieved through the electrical series connection of the EDI modules to an electrical power interface, including the electrical power interface 20/20'.

While the invention has been described in detail and with reference to specific examples thereof, it will be apparent to one skilled in the art that various changes and modifications can be made therein without departing from the spirit and scope thereof.

What is claimed is:

1. An electrodeionization (EDI) module purifying a fluid flow which EDI module is energized by DC power between an anode and a cathode, which converts an AC source into a stable DC current comprises:
   a transformer coupled to the AC source which can be adjusted for providing varying AC power at an output of the transformer;
   a phase-controller for controlling operation of a rectifier base on the AC power and on a feedback signal from the DC power;
   an autotransformer for adjusting said transformer to further adjust DC voltage/current output according to fluid temperature, fluid flow rate, fluid quality, or variances in the AC source or in the construction of the EDI module.

2. The electrodeionization EDI module of claim 1, wherein said autotransformer is automatically adjusted by an automatic control system which comprises:
   a sampling circuit having an input coupled to said anode;
   a reference voltage circuit having an input coupled to an output of said sampling circuit to form an electrical power interface input, said reference voltage circuit comparing said electrical power interface input against a reference voltage to generate difference signal; an amplifier for amplifying said difference signal; and
   a DC motor having an electrical power input coupled to a DC power supply through a switch controlled by said amplifier, said DC motor having a mechanical output coupled to and controlling a spindle of said autotransformer based on said difference signal.

3. The electrodeionization EDI module of claim 1, wherein said feedback signal comprises a voltage signal.

4. The electrodeionization EDI module of claim 1, wherein said rectifier is a full-wave rectifier.

5. The electrodeionization EDI module of claim 1, wherein said rectifier comprises a single-phase rectifier.

6. The electrodeionization EDI module of claim 1, wherein said rectifier comprises a three-phase rectifier.

7. The EDI module of claim 1, further comprising alternating anionic and cationic membranes which define alternating fluid chambers and concentrate chambers for conveying said fluid flow and a concentrate flow, respectively, said fluid chambers comprising ion exchange resins, all of which are spirally-wound around a central conductive pipe and all of which are contained within a conductive lining, said central conductive pipe comprising said cathode and said conductive lining comprising said anode, said cathode and said anode being connected to an electrical interface respectively.

8. An EDI module according to claim 7, wherein the electrical power interface further comprises an automatic control system coupled to an autotransformer for automatically adjusting said autotransformer.

9. An EDI module according to claim 8, wherein said automatic control system comprises: a sampling circuit having an input coupled to said anode; a reference voltage circuit having an input coupled to an output of said sampling circuit to form an electrical power interface input, said reference voltage circuit comparing said electrical power interface input against a reference voltage to generate difference signal; an amplifier for amplifying said difference signal; a DC motor having an electrical power input coupled to a DC power supply through a switch controlled by said amplifier, said DC motor having a mechanical output coupled to and controlling a spindle of said autotransformer based on said difference signal.

10. An EDI module according to claim 7, wherein said feedback signal comprises a voltage signal.

11. An EDI module according to claim 7, wherein said rectifier is a full-wave rectifier.

12. An EDI module according to claim 7, wherein said rectifier comprises a single-phase rectifier.

13. An EDI module according to claim 7, wherein-said rectifier comprises a three-phase rectifier.

14. The EDI module of claim 11, wherein the electrical power interface comprises a transformer coupled to the AC source that is adjustable for providing varying AC power at the transformer output and a phase-controller for controlling the operation of a rectifier based on the AC power and on a feedback signal from the DC power.

15. The EDI module of claim 14, wherein the transformer comprises an autotransformer.

16. A method for providing a stable DC current to the electrodeionization (EDI) module of claim 1 from an alternating current (AC) source wherein the at least one EDI module purifies a fluid flow when DC power is provided between an anode and a cathode of the EDI module, said method comprising a step of rectifying the AC power from the AC source into DC power using phase control and DC power feedback to stabilize the DC current after rectification that is unaffected by the fluid temperature, fluid flow rate, fluid quality, or variances in the AC source or in the construction of the at least one EDI module.

17. The method of claim 16, wherein said step of rectifying the AC power comprises synchronizing a phase controller with the AC power.

18. The method claim 17, wherein said step of rectifying the AC power comprises feeding back a voltage signal from the DC power to said phase controller.

19. The method of claim 16, wherein said phase controller uses proportional/integral control to generate pulse commands to a rectifier.

20. The method of claim 19, wherein said step of using proportional/integral control permits the control of pulse command parameters.

21. The method of claim 20, wherein said pulse command parameters include pulse width.

22. The method of claim 20, wherein said pulse command parameters include pulse amplitude.

23. The method of claim 20, wherein said pulse command parameters include pulse edge slope.

24. The method of claim 19, wherein step of rectifying the AC power into DC power comprises disposing an autotransformer between the AC source and a rectifier, said autotransformer being adjustable.

25. The method of claim 24, wherein said step of disposing an autotransformer between the AC source and said rectifier comprises automatically controlling the adjustment of said autotransformer based on said DC current.

26. The method of claim 25, wherein said step of automatically controlling the adjustment of said autotransformer comprises: coupling a DC motor output to said autotransformer; continuously comparing a portion of said DC power to a reference and using a difference between said portion of said DC power and said reference to activate said DC motor.

27. At least two electrodeionization (EDI) modules of claim 1 connected in electrical series for purifying a fluid flow which are energized by DC power between an anode of one of said at least two EDI modules and a cathode of the other one of said at least two EDI modules, wherein the DC power energizes the EDI module with stable DC current with a stable DC current that is converted from an AC source by an electrical power interface which further adjusts the DC voltage/current output so that the DC current that energizes the EDI module is unaffected by the fluid temperature, fluid flow rate, fluid quality, or variances in the AC source or in the construction of the EDI module.

28. At least two EDI modules according to claim 27, wherein said electrical power interface comprises a transformer that is coupled to the AC source, which transformer is adjustable for varying AC power at an output of the transformer, a phase-controller for controlling the operation of a rectifier based on the AC power and a feedback signal from the -DC power, said rectifier having a positive node and a negative node, and wherein said positive node is coupled to the anode of at least one of the at least two EDI modules and wherein said negative node is coupled to the cathode of another one of said at least two EDI modules, and wherein the cathode of at least one of the at least two EDI modules is coupled to the anode of said another one of said at least two EDI modules.

29. A method for providing a DC current to at least two electrodeionization (EDI) modules of claim 1 that are connected in electrical series, from an alternating current (AC) source wherein the at least two EDI modules purify a fluid flow when DC power is provided between an anode of one of said at least two EDI modules and a cathode of the other one of said at least two EDI modules, said method comprising a step of rectifying the AC power from the AC source into DC power and powering said at least two EDI modifies with the same DC current.

30. The method of claim 29, wherein said step of rectifying the AC power comprises using phase control and DC power feedback to stabilize the DC current after rectification that is unaffected by the fluid temperature, fluid flow rate, fluid quality, or variances in the AC source or in the construction of the at least EDI module.

31. The method of claim 30, wherein said step of rectifying the AC power comprises synchronizing a phase controller with the AC power.

32. The method claim 31, wherein said step of rectifying the AC power comprises feeding back a voltage signal from the DC power to said phase controller.

33. The method of claim 30, wherein said phase controller uses proportional/integral control to generate pulse commands to a rectifier.

34. The method of claim 33, wherein said step of using proportional/integral control permits the control of pulse command parameters.

* * * * *